July 3, 1962     I. V. WALKER     3,042,151
EMERGENCY CHOCK BRAKING APPARATUS FOR A WHEELED VEHICLE
Filed March 16, 1960     2 Sheets-Sheet 1
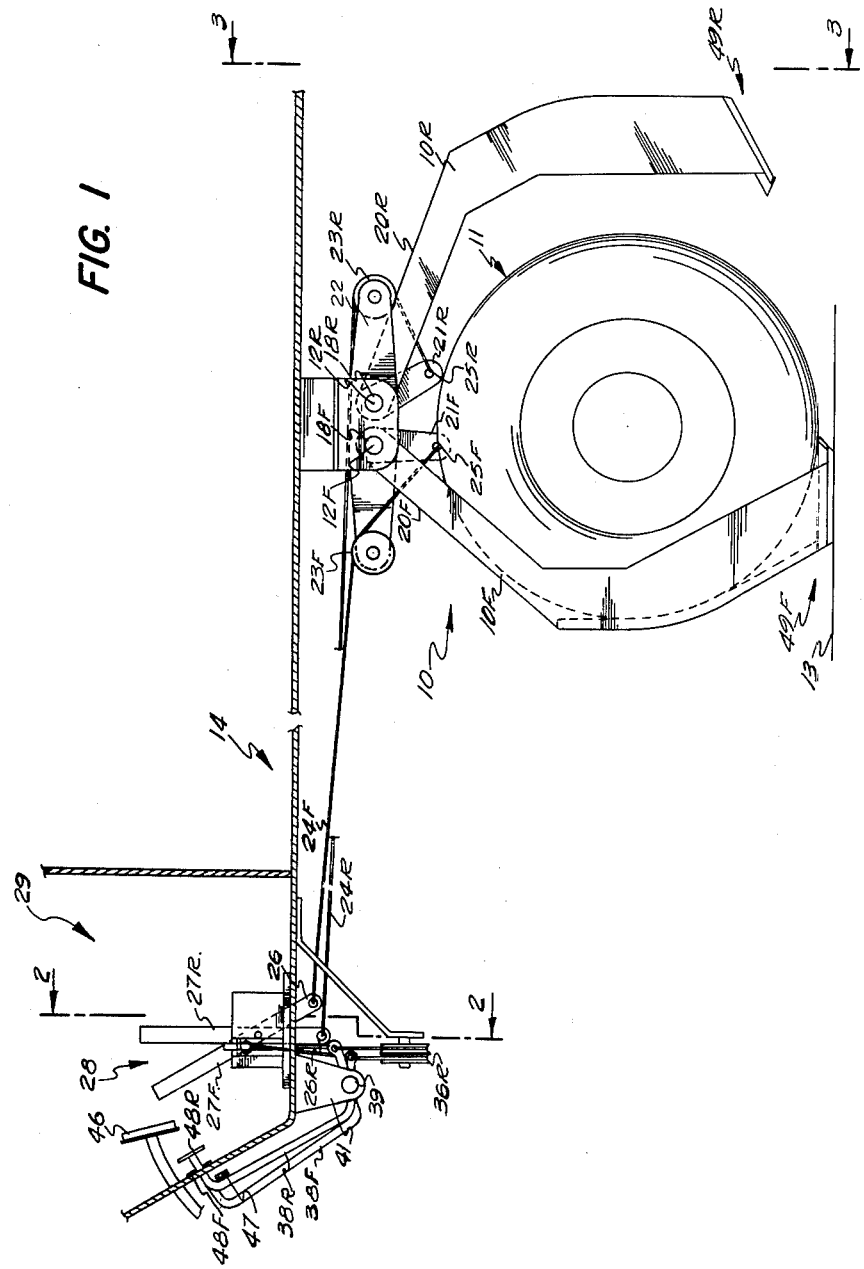
INVENTOR.
IRVIN V. WALKER

INVENTOR.
IRVIN V. WALKER

United States Patent Office 3,042,151
Patented July 3, 1962

3,042,151
EMERGENCY CHOCK BRAKING APPARATUS
FOR A WHEELED VEHICLE
Irvin V. Walker, Inglewood, Calif., assignor of one-tenth
to Gadget-Of-The-Month Club, Inc., North Hollywood,
Calif., a corporation of California
Filed Mar. 16, 1960, Ser. No. 15,290
2 Claims. (Cl. 188—4)

The present invention consists of an emergency chock braking apparatus for a wheeled vehicle such as a truck, bus, automobile, or the like, although not specifically so limited, wherein at least one pair of wheels of a wheeled vehicle is provided with chock means normally held out of engagement therewith but controllably releasable by an operator of the vehicle (such as a driver of a truck, or the like) for gravity-caused pivotal downward movement into at least partially underlying engagement with the wheels between same and an underlying road surface whereby to immobilize the vehicle with respect to the underlying road surface under emergency conditions.

It is an object of the present invention to provide an emergency chock braking apparatus for a wheeled vehicle of the character described above, adapted to normally position front and rear chock means in inoperative relationship with respect to adjacent wheel means but to allow either the front or rear chock means, or both, to be controllably dropped and pivotally swung into at least partially underlying engagement with the adjacent wheel either adjacent a forward portion thereof to stop forward movement of the vehicle, or adjacent a rear portion thereof to stop rearward movement of the vehicle, or both, under the control of an operator of the vehicle, such as the driver of a truck, or the like. The chock braking apparatus of the present invention is normally operated only under emergency conditions when the conventional braking system of the vehicle fails to work or works so ineffectively as to fail to stop movement of the vehicle with respect to an underlying road surface.

It is a further object to provide apparatus of the character set forth above, wherein the means for releasing the front and rear chocks are positioned in the driver's compartment portion of the vehicle and are independently operable or jointly operable and additionally are arranged to be automatically operated in a chock-releasing manner whenever the driver of the vehicle attempts to operate the braking system of the vehicle by depressing a brake pedal and finds that the braking system is inoperative—in other words, when the brake pedal goes all the way to the floor board of the driver's compartment portion of the vehicle.

Futher objects will be apparent to persons skilled in the art after a careful study hereof.

For the purpose of clarifying the nature of the present invention, one exemplary embodiment is illustrated in the hereinbelow-described figures of the accompanying two sheets of drawings, and is described in detail hereinafter.

FIG. 1 is a fragmentary side elevational view illustrating one exemplary embodiment of the present invention in mounted relationship with respect to a fragment of a wheeled vehicle, such as a truck, or the like, and showing the front chock in released operative position and showing the rear chock in lifted inoperative position. It should be noted that the body of the wheeled vehicle such as a truck, or the like, is shown fragmentarily and with major portions removed for drawing simplification purposes.

Figure 3:
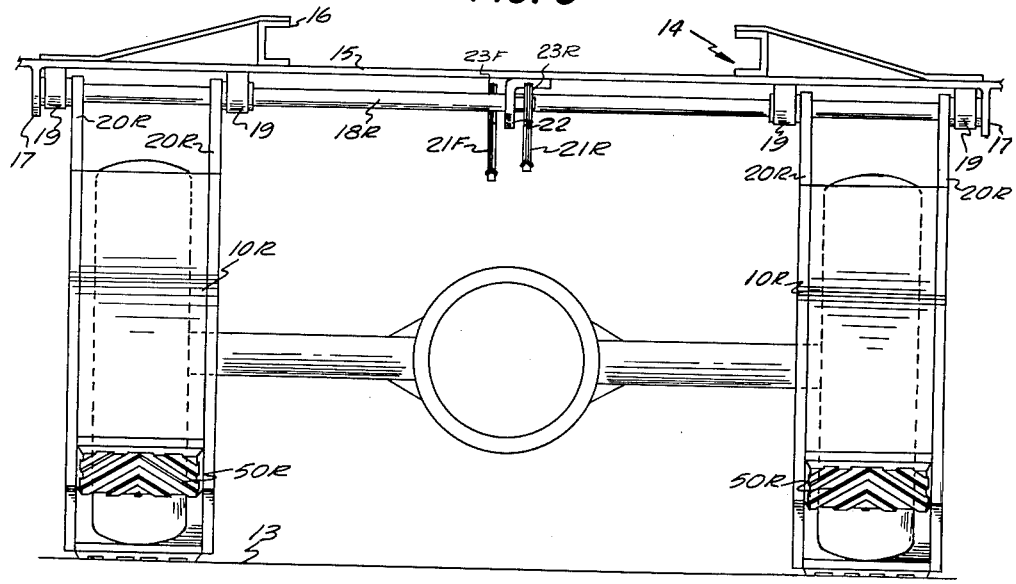
FIG. 3 is a fragmentary view taken in the direction of the arrows 3—3 of FIG. 1 and with major portions of the vehicle body removed for drawing simplification purposes.
Figure 2:
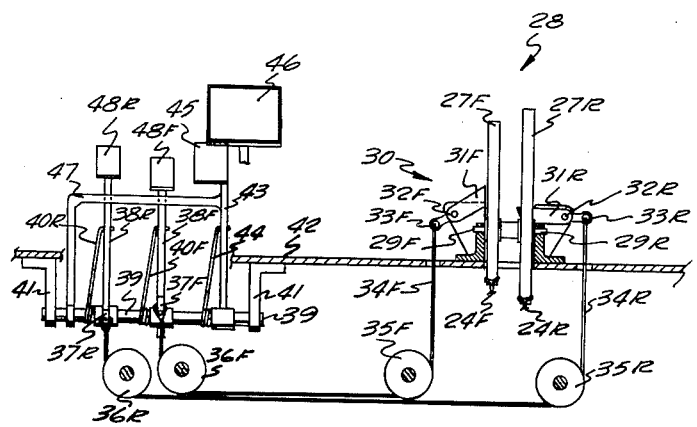
FIG. 2 is a reduced-size fragmentary view taken in the direction of the arrows 2—2 of FIG. 1 and with major portions of the vehicle body removed for drawing simplification purposes.

More specifically, referring to FIGS. 1–3, one exemplary form of the invention is shown fragmentarily for illustrative purposes, although it is not to be construed in a limiting sense. In the form illustrated, the invention includes chock means, indicated generally at 10, associated with each wheel, indicated generally at 11, with each chock means 10 including a front chock 10F and a rear chock 10R, and with the front chock 10F being pivotally mounted on a transverse axis indicated at 12F in FIG. 1 for pivotal downward and rearward movement into at least partially underlying engagement with respect to the wheel 11, in which position the front chock 10F is shown in FIGS. 1 and 3. In the specific example illustrated, the rear chock 10R is similarly pivotally mounted about a transverse axis 12R similar to, behind, and closely parallel and adjacent to the front transverse axis 12F, for pivotal downward and forward movement of the rear chock 10R into at least partially underlying engagement with respect to the wheel 11 in the same manner as, but opposite in direction to, the wheel-engaging movement of the front chock 10F described hereinbefore and clearly shown in FIGS. 1 and 3 in wheel-engaging and road-surface-engaging position contacting the surface of a road 13 whereby to immobilize the wheeled vehicle, generally indicated fragmentarily at 14, against forward movement thereof along the underlying road surface 13.

In the specific example illustrated, the pivotal mounting of each of the front and rear chocks 10F and 10R, about the transverse axes 12F and 12R, respectively, is accomplished by means of a strong structural member 15 carried underneath the frame channel members 16 of the motor vehicle 14 and having at each side of the motor vehicle body 14 downwardly directed brackets portions 17, which rotatably mount two axle or spindle members 18F and 18R, each concentrically positioned around the corresponding one of the two parallel transverse axes 12F and 12R, respectively, and each being rotatively mounted in bearing members 19 attached to the structural member 15, and each being fixedly attached at the top ends of the side members 20F and 20R of the front and rear chocks 10F and 10R, respectively, whereby pivotal movement of each of said front and rear chocks 10F and 10R, respectively, may be accomplished by corresponding rotary movement of the axles or spindles 18F and 18R, respectively, in the bearing members 19. It should be noted also that the front axle or spindle member 18F has keyed to it adjacent the center thereof an actuating lever member 21F for actuation thereof, and that the rear axle or spindle member 18R has keyed thereto adjacent the center thereof an actuating lever 21R for actuation thereof. The center portion of each of the axles or spindles 18F and 18R, respectively, rotatively pass through a center bracket member 22, which extends forwardly and rearwardly in a symmetrical manner with respect thereto and which carries at forward and rearward ends thereof rotary pulley sheaves 23F and 23R, respectively, engaging portions of longitudinal tensile members 24F and 24R, which have their rear ends fastened as indicated at 25F and 25R, respectively, to actuating ends of the actuating levers 21F and 21R, respectively, for selectively actuating in a lifting manner either of the front and rear chocks 10F and 10R in a manner which will be described more fully hereinafter.

It should be noted that the forward ends of the longitudinal tensile coupling members 24F and 24R, respectively, are connected to lower ends 26F and 26R, respectively, of individually manually operable levers 27F and 27R of chock-resetting means indicated generally at 28 and, which is positioned within the driver's compartment portion, indicated generally at 29 in fragmentary form, of the wheeled vehicle 14 for convenient operation by a driver thereof for chock-resetting purposes—that is, for lifting either the front chock 10F, the rear chock 10R, or both, into the upper extreme inoperative position similar to that in which the rear chock 10R is shown in FIGS. 1 and 3. It should be understood that the other end of each of the axles or spindle members 18F and 18R similarly are rigidly connected to top ends of side portions of front and rear chocks on the other side of the wheeled vehicle 14, the rear elevational view of which is shown in FIG. 3. Therefore, in view of this similar connection at left and right sides of front and rear chocks with respect to left and right wheels, it is believed that a detailed description of the right front and rear chocks and right wheel engaged thereby is redundant and further detailed description thereof will not be made.

The chock-resetting means indicated generally at 28 includes the two manually operable levers 27F and 27R, which are pivotally mounted by pivot pin means 29F and 29R, respectively, and also includes trip means, indicated generally at 30, comprising a trip member 31F and a trip member 31R pivotally mounted as indicated at 32F and 32R, respectively, and having outer ends 33F and 33R, respectively, connected to forward ends of the longitudinal tensile coupling members 24F and 24R, respectively, for applying chock-lifting tension to the corresponding front and rear chocks 10F and 10R. It should be noted that the levers 27F and 27R pivot in such manner with respect to the trip members 31F and 31R, respectively, as to be maintained in upright position (such as lever 27R, for example) by the corresponding trip member when it is in a horizontal or unactuated position, as shown in connection with the rear trip member 31R. However, when either of said trip members is actuated in the manner of the front trip member 31F, by applying tension of either of the corresponding tensile members 34F or 34R, said trip member is moved into a non-horizontal position against the action of a biasing spring (not shown, since such is well known in the art) in the manner of the front trip member 31F whereby to release the corresponding lever member, such as 27F, and allow it to be pivotally moved into chock-dropping position wherein the corresponding chock will be in its lowermost position engaging the wheel, as is shown in connection with the front chock 10F in FIGS. 1 and 3. It will readily be understood that said chock may be again moved into the said upper position similar to the position of the rear chock 10R by merely grasping the corresponding lever 27F and, after causing the motor vehicle 14 to move backwardly a short distance, pivotally moving the lever 27F into a vertical upright position parallel to the other lever 27R, which will allow the trip member 31F to engage the left lever 27F and retain it in chock-up position whereby the front chock 10F will be maintained in an upper position similar to the position of the rear chock 10R shown in FIGS. 1 and 3. The operation of the other chock-resetting lever 27R and trip member 31R is similar. It should be understood that the releasing actuation of the trip members 31F and/or 31R is accomplished by applying tension to the tensile members 34F and 34R, respectively, each of which passes around corresponding pulley sheaves 35F and 35R, respectively, and 36F and 36R, respecetively, and each of which is then appropriately connected to lever arm portions 37F and 37R of corresponding front and rear chock releasing pedals 38F and 38R, respectively, which are pivotally mounted on a transverse supporting rod 39 and which are spring biased by appropriate biasing springs 40F and 40R, respectively, into upper projecting positions for convenient pedal operation by a driver of a truck or vehicle who normally sits in the driver compartment portion 29 of the wheeled vehicle 14 during operation thereof. The transverse shaft 39 is carried by bracket members 41 with respect to the floor board portion 42. It should also be noted that an additional pedal 43 is pivotally carried on the rod or shaft 39 and is upwardly spring biased by a spring 44 and has a portion 45 underlying a conventional brake pedal 46 (shown fragmentarily) whereby a driver of the truck or other vehicle attempting to bring it to a stop by depressing the conventional brake pedal 46, and who finds that the braking system of the vehicle is inoperative as evidenced by the fact that the brake pedal 46 moves clear to the floor board, will bring about joint chock-releasing operation of both front and rear chocks 10F and 10R on both sides of the vehicle by reason of the fact that the brake pedal portion 46 will strike the portion 45 just before hitting the floor board and the transverse bar 47 will strike the two front and rear chock-releasing pedals 38F and 38R whereby to trip same and apply tension to the tensile members 34F and 34R so as to correspondingly actuate the trip members 31F and 31R and correspondingly release the chock-resetting levers 27F and 27R and thereby, through the longitudinal tensile coupling members 24F and 24R and the lever actuating members 21F and 21R, releasing front and rear chocks 10F and 10R. Correspondingly, it will readily be understood that operation of the foot-engageable portion 48F of the front chock-releasing pedal 38F will actuate only the trip member 31F and release only the chock-resetting holder 27F, thus releasing only front chocks 10F. Similarly, it will readily be understood that operation of the foot-engageable portion 48R of the rear chock-releasing pedal 38R will actuate only the trip member 31R and release only the chock-resetting handle 27R, thus releasing only rear chocks 10R.

Figure 4:
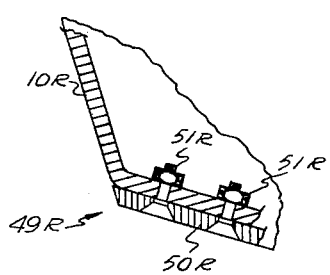
FIG. 4 is an enlarged fragmentary view illustrating the removable and interchangeable attachment of one of the road-surface-engageable members carried by each of the chocks.

In the preferred form of the invention illustrated, each of the chocks 10F and 10R has a controllably engageable and disengageable interchangeable road-surface-engageable member 49F and 49R, respectively. Each of these members may be provided with downwardly directed friction means at the bottom thereof adapted to provide very effective engagement with an underlying road surface. This is clearly shown at 50R in the case of the rear members 49R. In the specific example illustrated in FIG. 4, one of the rear road-surface-engageable members 49R is shown as being fastened to the bottom portion of the corresponding chock 10R by suitable threaded fastener means 51R. It should be understood that all of the other road-surface-engageable members carried by the other chock members may be similarly fastened for easy interchangeability and/or replacement, when desired.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. An emergency chock braking apparatus for a wheeled vehicle, comprising: a wheeled vehicle wherein at least one pair of wheels is provided with chock means normally held out of engagement therewith but controllably releasable by an operator of the vehicle for gravity-caused pivotal downward movement into at least partially underlying engagement therewith whereby to immobilize the vehicle with respect to an underlying road surface, the chock means associated with each wheel including a front chock and a rear chock, with the front chock being pivotally downwardly and rearwardly movable into at least partially underlying engagement with respect to the wheel for immobilizing the wheeled vehicle against forward movement and with the rear chock being pivotally downwardly and forwardly movable into at least partially underlying engagement with respect to the wheel for immobilizing the wheeled vehicle against rearward movement; separately independently and jointly controllably operable front and rear chock-releasing means carried by the wheeled vehicle in a driver compartment portion thereof located for actuation by a driver of the vehicle; separately independently and jointly controllably operable front and rear chock-resetting means carried by the wheeled vehicle in a driver compartment portion thereof located for actuation by a driver of the vehicle; and coupling means comprising multiple lever and longitudinal tensile members interconnecting the chock-resetting means with respect to the chock means, said chock-resetting means being provided with trip means normally engaged therewith and holding said chock-resetting means in chock-lifting position and being interconnected with said chock-releasing means whereby operation of said chock-releasing means will operate said trip means to release the corresponding chock-resetting means; said separately independently and jointly controllably operable front and rear chock-releasing means comprising independently operable foot pedals selectively pedally operable by a driver of the vehicle and coupling means positioned for engagement by and actuation by a conventional brake pedal when pedally depressed substantially beyond a normal brake engagement point, said coupling means effectively cooperating with said foot pedals for operating both of them when said coupling means is actuated by said conventional brake pedal whereby to release both of said chock-resetting means and corresponding front and rear chocks.

2. Apparatus of the character defined in claim 1, wherein each of said chocks has a controllably engageable and disengageable interchangeable road-surface-engageable member provided with a downwardly directed friction cleat means at the bottom thereof when the chock is in road-surface-engaging position at least partially underlying the adjacent wheel.

References Cited in the file of this patent
UNITED STATES PATENTS 1,148,047 Ray _____ July 27, 1915
1,151,068 Van Auken _____ Aug. 24, 1915
2,182,044 Ackerman _____ Dec. 5, 1939
2,275,079 Ingram _____ Mar. 3, 1942
2,483,048 Hergner _____ Sept. 27, 1949
2,718,283 Ropp _____ Sept. 20, 1955

FOREIGN PATENTS 912,224 France _____ Apr. 23, 1946